Jan. 25, 1927.
C. T. BARTLAM
1,615,298
WEB HANDLING AND DISPLAY SYSTEM
Filed June 30, 1924   2 Sheets-Sheet 2
Fig. 4.
Fig. 5.
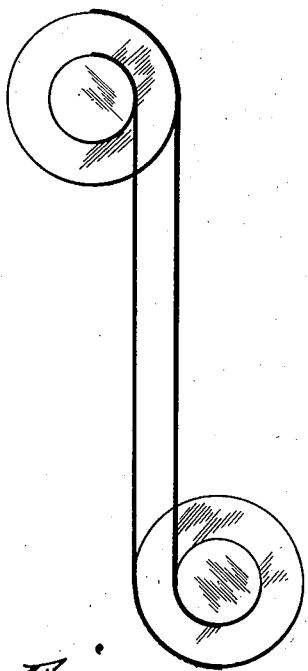
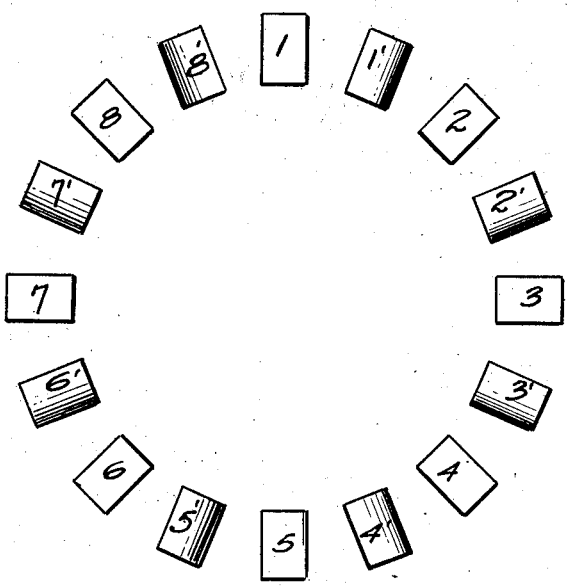
Fig. 6.
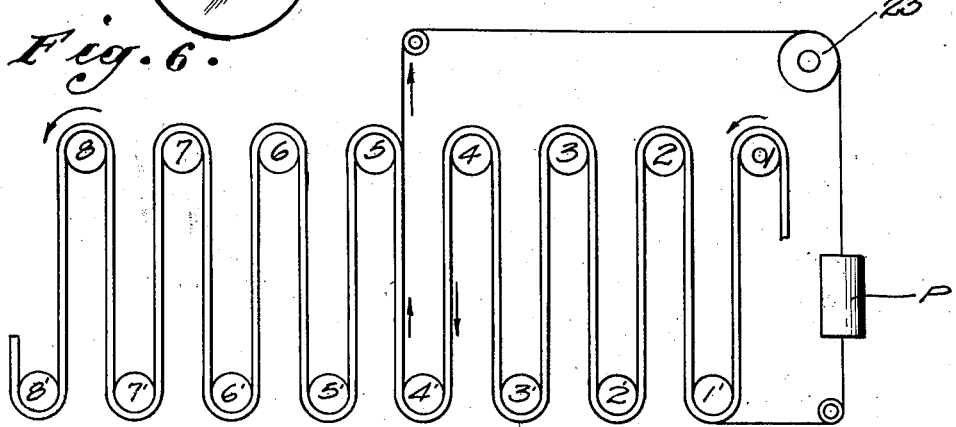
INVENTOR
CLINTON. T. BARTLAM
BY
Graham & Harris
ATTORNEYS Patented Jan. 25, 1927.

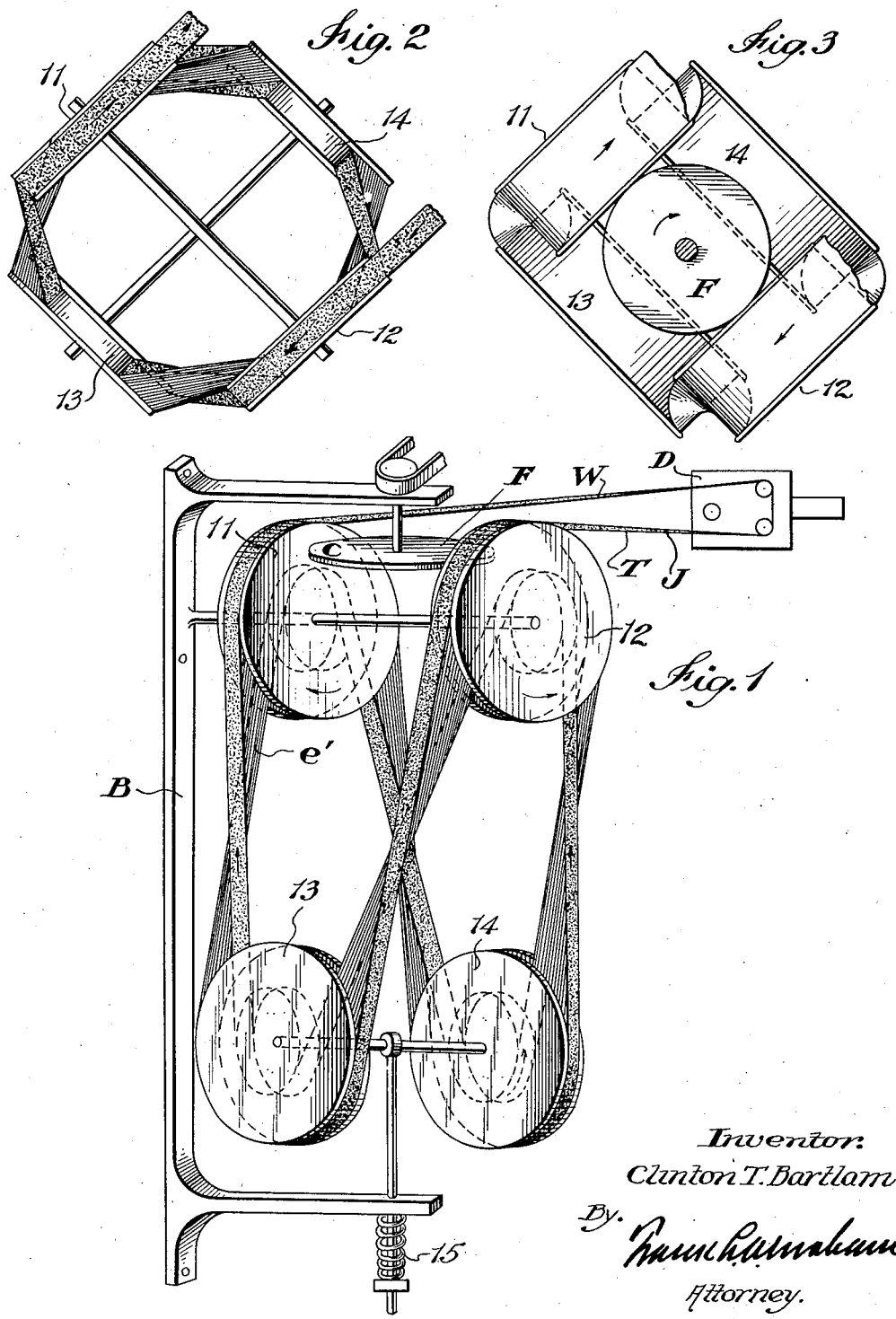

1,615,298

UNITED STATES PATENT OFFICE.

CLINTON T. BARTLAM, OF LOS ANGELES, CALIFORNIA.

WEB HANDLING AND DISPLAY SYSTEM.

Application filed June 30, 1924. Serial No. 723,207.

Although my present invention is referred to as a web handling and display system, it should be understood to be a primary object of this invention to provide means permitting a continuous and practically unlimited use of a single web or film, such as a moving picture film, carried through a projection apparatus, or the like, the film being wound and its ends united in such manner as entirely to obviate rewinding, the film or other web being always advanced in the same direction and through an unvarying path, to bring all parts successively and repeatedly into position for display, or other use.

It is a further object of this invention to provide a compact organization adapted to care for and manipulate a comparatively long film or other web, and to advance the same at any reasonable speed without subjecting it to undue wear and strain; and a preferred embodiment of my invention may involve the employment of certain principles of compensatory winding, whereby relative slippage between successive laps of film is minimized and strains due to twisting are rendered negligible.

It is a further object of my invention to provide means permitting the use of any desired even number of handling spools or reels, half of these being preferably arranged in an upper and driven series, in conjunction with one or more display devices, such as projection apparatus; and, in preferred embodiments of my invention, an upper series of spools may be so related to a lower or opposed series that the latter shall serve not only as guide elements, facilitating certain shiftings of position, with concurrent reversals of face, as hereinafter referred to, but shall serve also to bisect the angles between the axes of the successive spools of the upper series, thereby diminishing strain upon the film or other web.

In all forms of my invention, a section of film or web adapted to be carried through a projection apparatus, or the like, may be initially formed as a "short-cut" loop comprising overlapping ends taken respectively from oppositely-moving points in an "outermost" and in an "innermost" lap of the web as the same traverses spools in different series, the method of winding this web being an essential feature of my invention.

Other objects of my invention will appear from the following description of advantageous embodiments thereof, taken in connection with the appended claims and the accompanaying drawings, in which—

Fig. 1 is a diagrammatic perspective view of one advantageous form of my invention.

Fig. 2 is a diagrammatic plan view explanatory thereof.

Fig. 3 is a top plan view showing the essential features of a four-spool embodiment similar to that diagrammatically illustrated in Figs. 1 and 2.

Fig. 4 is a mere diagram illustrating a principle of compensation upon which the operativeness of my invention depends.

Fig. 5 is a diagrammatic plan view of an embodiment of my invention employing eight upper spools and eight lower spools arranged in a circular series.

Fig. 6 is a diagrammatic elevational development of the organization shown in Fig. 5, with a "short-cut" loop and a projecting apparatus diagrammatically indicated.

Referring to the details of that specific embodiment of my invention illustrated in Figs. 1, 2 and 3, 11 and 12 may be oppositely driven reels or speels adapted to carry a web W, which may be a moving picture film, the axes of these spools being substantially parallel and at right angles to the axes of a pair of similar spools 13, 14, supported therebelow and equally spaced apart, the lower spools referred to being either permitted to "float", or held under tension by means such as a spring 15, or its equivalent.

The operativeness of my invention depends upon the exact method of winding the web W, or its equivalent, upon a pair or set of spools, and the essential principle of this winding may be readily understood from an inspection of Fig. 1.

The threading of the web onto a four-spool organization may be easily effected by simply carrying one end of a film or other web over the spool 12, under the spool 13, leaving the inner face of the film in contact with both of these spools, reversing the face of the film in carrying the same over the spool 11, advancing the same without reversal beneath the spool 14, again and oppositely reversing the face in carrying the end of the web towards the spool 12, and then temporarily securing the free end of the web to the inner or lower surface of that portion of the web still advancing over the spool 12. Further rotation of all of the spools in the direction of the original advance of the web will have the effect of winding the same completely upon the spools in the manner illustrated; and when the "tail" end of the web has advanced to substantially the position indicated at T in Fig. 1, the last lap of the web which has passed over the spool 11, this being near the leading end thereof, may be put through a projection or other display apparatus, schematically indicated at D, and joined, as at J, to the "tail" end of the film or web referred to. Suitable rotation may be imparted to the respective spools, or to certain upper spools only, by any suitable means, a friction drive wheel being shown schematically at F; and the entire organization may be supported in any suitable way, as by means of a bracket B, details of support, driving mechanism and housing being immaterial to my present invention.

In the form of my invention illustrated in Figs. 5 and 6, I propose the employment of eight upper spools and a corresponding number of lower spools, all of these spools being arranged in two circular series with the axes thereof in radial lines from common centers respectively, and the spools of either series being "primary."

Fig. 5 being a mere diagrammatic or developmental display of the arrangement illustrated in Fig. 5, it will be appreciated that, in this case also, the film is wound in a self-compensating manner over an even number of spools, a short-cut lap being carried through a projection apparatus P, (wherein it may have an intermittent motion) the essential principle being, as best illustrated in Fig. 4, that a lap which occupies an outermost position upon one spool becomes an innermost lap upon the succeeding spool. To reduce friction between bands and to avoid buckling and edge wear, it is advantageous that the center lines through all of the masses of film bands lie in substantially vertical parallel planes, substantially as shown in Fig. 3, disclosing two spools in each circular series.

Although, I have herein described several alternative embodiments of my invention, it will be understood that various features thereof might be independently employed, and also that additional modifications might be made by those skilled in the art, without the slightest departure from the spirit and scope of my invention, as the same is indicated above and in the following claims.

I claim as my invention:

1. In an endless web handling system: a primary series of spools; a secondary series of spools, the spools in each said series being equidistantly mounted upon radial axes in a common plane and the said series of spools mounted in two separate planes and around a single axis common to both planes or series of spools; and a web repeatedly wound around said spools, alternating in said winding from a spool in the primary series to a spool in the secondary series so that each band or mass of bands extending from one series to the other series shall not be subjected to any excessive twist within the length of the said band or mass of bands between the said series of spools.

2. In an endless web handling system: a primary series of spools; a secondary series of spools; and a web repeatedly wound around the spools in both series, alternating in the said winding from a spool in one series to a spool in the other series, so that a band or web curved to the right around the outside of a mass on a spool in one series shall next curve to the left around the inside of a mass on a spool in the other series, and adjacent spools in the opposed series being on opposite sides of the mass of bands or webs, so that the curving of the bands alternately to the right and left over spools in alternate series shall cause either outside band or web of the mass of bands to curve along the inside of the mass over a spool in one series and along the outside of the mass over a spool in the other series.

3. In an endless web handling system: a primary series of spools; a secondary series of spools, said series of spools being mounted in planes parallel each to the other and around an axis common to both of said series of spools; a web repeatedly wound around the spools in both of the said series, alternating in said winding from a spool in the primary series to a spool in the secondary series so that a plurality of bands pass from each of the spools in one series to each of the spools in the other series, forming a mass of bands or webs passing over all of said spools in such a manner that all bands in circuit of said system shall be of equal length.

4. In an endless web handling system: a plurality of spools rotatably mounted upon radial axes, said axes being mounted equidistantly in the same plane about a common center; a second series of said spools, similarly mounted, the two said series of spools mounted in two separate but parallel planes and around an axis common to both series; said two series of spools being mounted on said common axis in such a manner that a line drawn perpendicular to and through the axis of a spool in one series, parallel to, and in the same plane as the common axis of the two series, shall intersect a line bisecting the angle formed by two adjacent radial axes of the other series of spools; and a web or band repeatedly wound around the spools of both series, alternating in said winding, from a spool in one series to a spool in the other series, in such a manner that when said web, or mass of webs, is moving in a given direction, the spools of one series shall rotate in a direction opposite to that of the spools in the other series, each spool of either series being viewed separately from a point at, or adjacent to, the common axis of both said series and within the circumferences bounded by the said radially mounted spools in the respective series.

5. In an endless web handling system: a primary series of spools; a secondary series of spools; the spools in both of the said series being rotatably mounted upon radial axes, and the two said series of spools being mounted, in two separate but parallel planes about a single axis common, and perpendicular to both of the said planes in which the said series of spools are mounted, the organization comprising both of said series of spools being maintained in a vertical position so that one series of spools may be readily designated the "top series" and the other series as the "bottom series"; a suitable means of imparting motion to the upper or "top series" of the spools in said organization; and a band or web repeatedly wound around all the spools in said organization, alternating from a spool in the "top series" to a spool in the "bottom series" of said organization.

In testimony whereof, I have hereunto set my hand at Los Angeles, California, this 21 day of June, 1924.

CLINTON T. BARTLAM.